United States Patent
Sato et al.

(10) Patent No.: US 11,359,092 B2
(45) Date of Patent: Jun. 14, 2022

(54) RESIN COMPOSITION, MOLDED ARTICLE, FILM, AND MULTILAYER FILM

(71) Applicant: Mitsubishi Gas Chemical Company, Inc., Tokyo (JP)

(72) Inventors: Kazuya Sato, Hiratsuka (JP); Takanori Miyabe, Hiratsuka (JP); Tomonori Kato, Hiratsuka (JP)

(73) Assignee: Mitsubishi Gas Chemical Company, Inc., Tokyo (JP)

( * ) Notice: Subject to any disclaimer, the term of this patent is extended or adjusted under 35 U.S.C. 154(b) by 0 days.

(21) Appl. No.: 16/498,275

(22) PCT Filed: Mar. 12, 2018

(86) PCT No.: PCT/JP2018/009388
§ 371 (c)(1),
(2) Date: Sep. 26, 2019

(87) PCT Pub. No.: WO2018/180401
PCT Pub. Date: Oct. 4, 2018

(65) Prior Publication Data
US 2020/0079959 A1  Mar. 12, 2020

(30) Foreign Application Priority Data

Mar. 28, 2017 (JP) .............................. JP2017-062262
Sep. 15, 2017 (JP) .............................. JP2017-177918

(51) Int. Cl.
| | | |
|---|---|---|
| C08L 77/10 | (2006.01) | |
| B32B 27/34 | (2006.01) | |
| C08G 69/32 | (2006.01) | |
| C08G 69/42 | (2006.01) | |

(52) U.S. Cl.
CPC .............. *C08L 77/10* (2013.01); *B32B 27/34* (2013.01); *C08G 69/32* (2013.01); *C08G 69/42* (2013.01); *B32B 2323/00* (2013.01); *B32B 2377/00* (2013.01); *C08L 2201/10* (2013.01); *C08L 2201/14* (2013.01); *C08L 2203/16* (2013.01); *C08L 2203/30* (2013.01); *C08L 2205/02* (2013.01)

(58) Field of Classification Search
CPC .......... C08L 77/00; C08L 77/02; C08L 77/04; C08L 77/06; C08L 77/10; C08L 2205/02; C08L 2205/025
See application file for complete search history.

(56) References Cited

U.S. PATENT DOCUMENTS

| | | | |
|---|---|---|---|
| 3,536,804 A | 10/1970 | Fujimoto et al. | |
| 4,983,719 A | 1/1991 | Fox et al. | |
| 5,268,219 A | 12/1993 | Harada et al. | |
| 2006/0210743 A1 | 9/2006 | Bekele | |
| 2007/0184221 A1 | 8/2007 | Reighard | |
| 2010/0304164 A1* | 12/2010 | Sato ........................ | C08L 51/06 428/476.9 |
| 2011/0076507 A1 | 3/2011 | Shearer et al. | |
| 2012/0065327 A1 | 3/2012 | Ogawa et al. | |
| 2013/0317158 A1 | 11/2013 | De Campo et al. | |
| 2014/0120289 A1 | 5/2014 | Arakawa et al. | |
| 2017/0073469 A1* | 3/2017 | Tochihara .............. | C08G 69/28 |
| 2018/0334539 A1* | 11/2018 | Kato ...................... | C08G 69/28 |
| 2019/0070072 A1 | 3/2019 | Arakawa et al. | |

FOREIGN PATENT DOCUMENTS

| | | |
|---|---|---|
| CN | 103619956 A | 3/2014 |
| CN | 105829398 A | 8/2016 |
| JP | H03-87254 A | 4/1991 |
| JP | H04-198329 A | 7/1992 |
| JP | H06-145513 A | 5/1994 |

(Continued)

OTHER PUBLICATIONS

Extended European Search Report issued in corresponding European Application No. 18774292.9 dated Mar. 26, 2020 (7 pages).
International Preliminary Report on Patentability and Written Opinion for PCT/JP2018/009388, dated Jun. 12, 2018, and English Translation submitted herewith (12 pages).
International Search Report for PCT/JP2018/009388, dated Jun. 12, 2018, and English Translation submitted herewith (5 pages).
Office Action issued in corresponding Chinese Application No. 201880021701.X dated Jul. 6, 2021 (6 pages).

*Primary Examiner* — Ana L. Woodward
(74) *Attorney, Agent, or Firm* — Fitch, Even, Tabin & Flannery LLP (57) ABSTRACT

Object: To provide a resin composition having excellent oxygen barrier properties and transparency, and high tensile elongation at break; a molded article, a film, and a multilayer film.

Resolution means: A resin composition including from 20 to 80 parts by mass of a polyamide resin (A) and from 80 to 20 parts by mass of a polyamide resin (B); wherein more than 35 mol % of all the constituent units of the polyamide resin (A) are constituent units including an alkylene chain having from 2 to 6 carbons; the polyamide resin (B) includes constituent units derived from a diamine and constituent units derived from a dicarboxylic acid, wherein 70 mol % or more of the constituent units derived from a diamine are derived from a xylylenediamine; from 30 to 70 mol % of the constituent units derived from a dicarboxylic acid are derived from an α,ω-linear aliphatic dicarboxylic acid having from 4 to 8 carbons; from 70 to 30 mol % of the constituent units derived from a dicarboxylic acid are derived from isophthalic acid, with the proviso that the total does not exceed 100 mol %; and the polyamide resin (B) further includes phosphorus atoms in a ratio of 3 to 300 mass ppm, and calcium atoms so as to be the ratio that phosphorus atoms:calcium atoms of 1:0.3 to 0.7.

12 Claims, 1 Drawing Sheet

(56) References Cited

FOREIGN PATENT DOCUMENTS

| | | |
|---|---|---|
| JP | H07-33439 B2 | 4/1995 |
| JP | H07-223305 A | 8/1995 |
| JP | 2010-254811 A | 11/2010 |
| JP | 2014-506616 A | 3/2014 |
| JP | 2014-057632 A | 4/2014 |
| JP | WO 2017/090556 A1 * | 1/2017 |
| WO | 2010/137703 A1 | 12/2010 |
| WO | 2015/174345 A1 | 11/2015 |
| WO | 2017/141969 A1 | 8/2017 |

* cited by examiner

RESIN COMPOSITION, MOLDED ARTICLE, FILM, AND MULTILAYER FILM

CROSS-REFERENCE TO RELATED APPLICATIONS

This application is a U.S. national phase application filed under 35 U.S.C. § 371 of International Application Number PCT/JP2018/009388, filed Mar. 12, 2018, designating the United States, which claims priority from Japanese Application Number 2017-177918, filed Sep. 15, 2017, and Japanese Application Number 2017-062262, filed Mar. 28, 2017.

FIELD OF THE INVENTION

The present invention relates to a resin composition, a molded article, a film, and a multilayer film. In particular, the present invention relates to a resin composition including a polyamide resin.

BACKGROUND OF THE INVENTION

Aliphatic polyamide resins, such as polyamide 6 and polyamide 66, which have excellent transparency, toughness, and pinhole resistance, are widely used in films and containers. Aliphatic polyamide resins themselves, however, do not have so high oxygen barrier properties that they may have failed to provide sufficient oxygen barrier properties when they were used in a container for oxygen-sensitive food and the like.

A technique of blending m-xylylene adipamide, which has excellent barrier properties, into these aliphatic polyamides (Patent Document 1) is known as a technique to supplement the oxygen barrier properties. The technique of blending m-xylylene adipamide into polyamide 6 or polyamide 66, however, has a problem of imparting a pearl-tone white cloudiness to the resin, resulting in poor visibility of the content.

In addition, a polyamide resin obtained by reaction of a xylylenediamine, isophthalic acid, and adipic acid is disclosed as a polyamide resin with excellent oxygen barrier properties (Patent Document 2).

CITATION LIST

Patent Literature

Patent Document 1: JP 06-145513 A
Patent Document 2: JP 07-33439 B

SUMMARY OF INVENTION

As a result of reviewing Patent Document 2, it was found that, the resulting molded article may have a white cloudiness depending on the copolymerization ratio of the xylylenediamine, isophthalic acid, and adipic acid when blended into the aliphatic polyamide resin. In addition, a higher tensile elongation at break may also be required depending on the application.

The present invention aims to solve the problems described above, and to provide a resin composition having excellent oxygen barrier properties and transparency, low yellowness, and a high tensile elongation at break; as well as a molded article, a film, and a multilayer film formed of the resin composition.

As a result of diligent studies conducted by the present inventor, the above problem has been solved by the following means (1), preferably by means from (2) to (11) described below.

(1) A resin composition including from 20 to 80 parts by mass of a polyamide resin (A) and from 80 to 20 parts by mass of a polyamide resin (B); wherein more than 35 mol % of all the constituent units of the polyamide resin (A) are constituent units including an alkylene chain having from 2 to 6 carbons; the polyamide resin (B) includes constituent units derived from a diamine and constituent units derived from a dicarboxylic acid, wherein 70 mol % or more of the constituent units derived from a diamine are derived from a xylylenediamine; from 30 to 70 mol % of the constituent units derived from a dicarboxylic acid are derived from an α,ω-linear aliphatic dicarboxylic acid having from 4 to 8 carbons; from 70 to 30 mol % of the constituent units derived from a dicarboxylic acid are derived from isophthalic acid, with the proviso that the total does not exceed 100 mol %; and the polyamide resin (B) further includes phosphorus atoms in a ratio of 3 to 300 mass ppm, and calcium atoms so as to be the ratio that phosphorus atoms: calcium atoms of 1:0.3 to 0.7.

(2) The resin composition according to (1), wherein the α,ω-linear aliphatic dicarboxylic acid having from 4 to 8 carbons includes adipic acid.

(3) The resin composition according to (1) or (2), wherein the xylylenediamine includes m-xylylenediamine.

(4) The resin composition according to any one of (1) to (3), wherein 70 mol % or more of all the constituent units of the polyamide resin (A) are constituent units including an alkylene chain having from 2 to 6 carbons; or from 40 to 60 mol % of all the constituent units of the polyamide resin (A) are constituent units including an alkylene chain having from 2 to 6 carbons, and from 60 to 40 mol % of all the constituent units of the polyamide resin (A) are constituent units derived from an aromatic dicarboxylic acid, with the proviso that the total does not exceed 100 mol %.

(5) The resin composition according to any one of (1) to (3), wherein the polyamide resin (A) includes at least one type selected from the group consisting of polyamide 6, polyamide 66, polyamide 6,66, polyamide 6I, polyamide 6T, and polyamide 6I/6T.

(6) The resin composition according to any one of (1) to (5), wherein calcium atoms included in the polyamide resin (B) are derived from calcium hypophosphite.

(7) A molded article formed of the resin composition described in any one of (1) to (6).

(8) A molded article formed of a layer including the resin composition described in any one of (1) to (6).

(9) A film formed of the resin composition described in any one of (1) to (6).

(10) A multilayer film formed of a layer including the resin composition described in any one of (1) to (6).

(11) The multilayer film according to (10), further including a polyolefin resin layer.

According to the present invention, a resin composition having excellent oxygen barrier properties and transparency, a low yellowness, and a high tensile elongation at break can be provided; also, a molded article, a film, and a multilayer film formed of the resin composition can be provided.

DESCRIPTION OF EMBODIMENTS

The contents of the present invention will be described in detail below. In the present specification, "from . . . to . . . ", "of . . . to . . . ", or " . . . to . . . " is used in a sense that the numerical values described before and after "to" are included as the lower limit value and the upper limit value, respectively.

The resin composition of the present invention is characterized in that the resin composition includes from 20 to 80 parts by mass of a polyamide resin (A) and from 80 to 20 parts by mass of a polyamide resin (B), wherein more than 35 mol % of all the constituent units of the polyamide resin (A) are constituent units including an alkylene chain having from 2 to 6 carbons; the polyamide resin (B) includes constituent units derived from a diamine and constituent units derived from a dicarboxylic acid, wherein 70 mol % or more of the constituent units derived from a diamine are derived from a xylylenediamine; from 30 to 70 mol % of the constituent units derived from a dicarboxylic acid are derived from an α,ω-linear aliphatic dicarboxylic acid having from 4 to 8 carbons; from 70 to 30 mol % of the constituent units derived from a dicarboxylic acid are derived from isophthalic acid; and the polyamide resin (B) further includes phosphorus atoms in a ratio of 3 to 300 mass ppm, and calcium atoms so as to be the ratio that phosphorus atoms:calcium atoms of 1:0.3 to 0.7. Herein, the total does not exceed 100 mol %.

Such a configuration can provide a resin composition having excellent oxygen barrier properties and transparency, low yellowness, and a high tensile elongation at break.

That is, the polyamide resin (A) has a high tensile elongation at break and excellent transparency. On the other hand, the polyamide resin (B) has excellent transparency and oxygen barrier properties. When the resins are not well compatible with each other, the transparency may be impaired. In the present invention, a polyamide resin including more than 35 mol % of a constituent unit including an alkylene chain having from 2 to 6 carbons is used as the polyamide resin (A), and thus the resins are successfully blended without impairing the transparency, while the tensile elongation at break and oxygen barrier properties, which are inherent in each resin, are preserved. Furthermore, the polyamide resin (B) including phosphorus atoms in a ratio from 3 to 300 mass ppm and calcium atoms so as to be the ratio that phosphorus atoms:calcium atoms of 1:0.3 to 0.7 can reduce the yellowness (YI value).

Polyamide Resin (A)

The resin composition of the present invention includes a polyamide resin (A), wherein more than 35 mol % of all the constituent units of the polyamide resin (A) are constituent units including an alkylene chain having from 2 to 6 carbons.

More than 35 mol %, preferably 40 mol % or more, and more preferably 45 mol % or more of all the constituent units of the polyamide resin (A) are constituent units including an alkylene chain having from 2 to 6 carbons. The upper limit for the ratio of the constituent units including an alkylene chain having from 2 to 6 carbons is 100 mol % of all the constituent units. The polyamide resin (A) including the constituent units including an alkylene chain having from 2 to 6 carbons as described above has improved compatibility with the polyamide resin (B), and thus can improve the transparency of the resulting resin composition.

Note that polyamide resins corresponding to the polyamide resin (B) are excluded from the polyamide resin (A) used in the present invention.

The polyamide resin (A) may include only one type, or two or more types of the constituent units including an alkylene chain having from 2 to 6 carbons. When the polyamide resin (A) includes two or more types of the constituent units, the total amount thereof is preferably within the range described above.

In the polyamide resin (A), the constituent units including an alkylene chain having from 2 to 6 carbons are preferably constituent units including an alkylene chain having from 3 to 6 carbons, and more preferably constituent units including an alkylene chain having from 4 to 6 carbons.

In addition, the constituent units including an alkylene chain having from 2 to 6 carbons are preferably constituent units consisting of a linear alkylene chain having from 2 to 6 carbons, and at least one of —NH— or –CO—.

The constituent units including an alkylene chain having from 2 to 6 carbons are preferably constituent units derived from succinic acid, ethylene diamine, 3-aminopropanoic acid, glutaric acid, trimethyldiamine, 4-aminobutanoic acid, adipic acid, tetramethylenediamine, 5-aminopentanoic acid, pimelic acid, pentamethylenediamine, ε-caprolactam, 6-aminohexanoic acid, suberic acid, hexamethylenediamine, or 7-aminoheptanic acid, and more preferably constituent units derived from ε-caprolactam, adipic acid, or hexamethylene diamine.

The polyamide resin (A) may include a constituent unit other than the above constituent units including an alkylene chain having from 2 to 6 carbons. Such a constituent unit is exemplified by constituent units derived from: an aliphatic diamine, such as 1,3-bis(aminomethyl)cyclohexane, 1,4-bis(aminomethyl)cyclohexane, octamethylenediamine, and nonamethylenediamine; an aromatic diamine, such as p-phenylenediamine, m-xylylenediamine, and p-xylylenediamine; an aliphatic dicarboxylic acid, such as azelaic acid, sebacic acid, 1,9-nonadicarboxylic acid, and dodecanedioic acid; and an aromatic dicarboxylic acid, such as terephthalic acid, isophthalic acid, 1,3-naphthalenedicarboxylic acid, 1,4-naphthalenedicarboxylic acid, 1,8-naphthalenedicarboxylic acid, and 2,6-naphthalenedicarboxylic acid. Among them, a constituent unit derived from an aromatic dicarboxylic acid is preferred, and a constituent unit derived from at least one type of terephthalic acid or isophthalic acid is more preferred.

Specific examples of the polyamide resin (A) of the present invention include at least one type selected from the group consisting of polyamide 6, polyamide 66, polyamide 6,66, polyamide 6I (a copolymer of hexamethylenediamine and isophthalic acid), polyamide 6T (a copolymer of hexamethylenediamine and terephthalic acid), polyamide 6I/6T, polyamide 610, polyamide 612, MXD6 (poly-m-xylylene adipamide), and MPXD6 (poly-m-,p-xylylene adipamide); and at least one type selected from the group consisting of polyamide 6, polyamide 66, polyamide 6,66, polyamide 6I, polyamide 6T, and polyamide 6I/6T is more preferred.

A first preferred embodiment of the polyamide resin (A) in the present invention is a configuration wherein 70 mol % or more, preferably 75 mol % or more, more preferably 80 mol % or more, still more preferably 90 mol % or more, even more preferably 95 mol % or more, and even still more preferably 99 mol % of all the constituent units are the above constituent units including an alkylene chain having from 2 to 6 carbons. In this embodiment, specific examples of constituent units other than the constituent units including an alkylene chain having from 2 to 6 carbons include the aliphatic diamine, the aromatic diamine, the aliphatic dicarboxylic acid, and the aromatic dicarboxylic acid, described above. Specific examples of the first embodiment include polyamide 6, polyamide 66, and polyamide 6,66.

A second preferred embodiment of the polyamide resin (A) in the present invention is a configuration wherein from 40 to 60 mol %, preferably from 45 to 55 mol % of all the constituent units of the polyamide resin (A) are the above constituent units including an alkylene chain having from 2 to 6 carbons, and from 60 to 40 mol %, preferably from 55 to 45 mol % of all the constituent units of the polyamide resin (A) are constituent units derived from an aromatic dicarboxylic acid. However, the total does not exceed 100 mol %. In the second embodiment, the aromatic dicarboxylic acid preferably includes at least one type of isophthalic acid or terephthalic acid, more preferably from 50 to 80 mol % of isophthalic acid and from 50 to 20 mol % of terephthalic acid, and still more preferably from 55 to 75 mol % of isophthalic acid and from 45 to 25 mol % of terephthalic acid.

In this embodiment, specific examples of constituent units other than the constituent units including an alkylene chain having from 2 to 6 carbons and the aromatic dicarboxylic acid include the aliphatic diamine, the aromatic diamine, and the aliphatic dicarboxylic acids described above. Specific examples of the second embodiment include polyamide 6I, polyamide 6T, and polyamide 6I/6T.

The polyamide resin (A) in the present invention is particularly preferably the above first preferred embodiment.

A number average molecular weight of the polyamide resin (A) in the present invention is preferably from 5000 to 100000.

The number average molecular weight in the present invention is measured according to the description in paragraph 0029 of the pamphlet of WO 2016/084475.

Polyamide Resin (B)

The resin composition of the present invention includes the polyamide resin (B) including constituent units derived from a diamine and constituent units derived from a dicarboxylic acid, wherein 70 mol % or more of the constituent units derived from a diamine are derived from a xylylenediamine, and from 30 to 70 mol % of the constituent units derived from a dicarboxylic acid are derived from an α,ω-linear aliphatic dicarboxylic acid having from 4 to 8 carbons, and from 70 to 30 mol % of the constituent units derived from a dicarboxylic acid are derived from isophthalic acid; and the polyamide resin (B) further includes phosphorus atoms in a ratio of 3 to 300 mass ppm, and calcium atoms so as to be the ratio that phosphorus atoms:calcium atoms of 1:0.3 to 0.7. However, the total of the constituent units derived from an α,ω-linear aliphatic dicarboxylic acid having from 4 to 8 carbons and the constituent units derived from isophthalic acid does not exceed 100 mol %. Such polyamide resins have excellent transparency and oxygen barrier properties, and achieve low YI values. The polyamide resin (B) used in the present invention is typically an amorphous resin. Use of the amorphous resin can improve the transparency. The amorphous resin is a resin that does not have a distinct melting point, and specifically, it means that the crystal melting enthalpy ΔHm is less than 5 J/g, preferably 3 J/g or less, and more preferably 1 J/g or less.

In the present invention, 70 mol % or more of the constituent units derived from a diamine in the polyamide resin (B) are derived from a xylylenediamine (preferably, p-xylylenediamine and/or m-xylylenediamine, more preferably m-xylylenediamine). Of the constituent units derived from a diamine, preferably 80 mol % or more, more preferably 90 mol % or more, still more preferably 95 mol % or more, even more preferably 98 mol % or more, and even still more preferably 99 mol % or more are derived from a xylylenediamine (preferably, m-xylylenediamine).

Examples of diamines other than the xylylenediamine include aromatic diamines, such as p-phenylenediamine; and aliphatic diamines, such as 1,3-bis(aminomethyl)cyclohexane, 1,4-bis(aminomethyl)cyclohexane, tetramethylenediamine, pentamethylenediamine, hexamethylenediamine, octamethylenediamine, and nonamethylenediamine. Only one type, or two or more types of these other diamines may be included.

In the present invention, of the constituent units derived from a dicarboxylic acid in the polyamide resin (B), from 30 to 70 mol % are derived from an α,ω-linear aliphatic dicarboxylic acid having from 4 to 8 carbons, and 70 to 30 mol % are derived from isophthalic acid.

Of the total dicarboxylic acids constituting the constituent units derived from a dicarboxylic acid in the polyamide resin (B), the lower limit for the ratio of isophthalic acid is preferably 33 mol % or more, more preferably 35 mol % or more, still more preferably 38 mol % or more, even more preferably 40 mol % or more, and even more preferably 41 mol % or more. The upper limit for the ratio of the isophthalic acid is preferably 67 mol % or less, more preferably 65 mol % or less, even more preferably 62 mol % or less, and further still more preferably 60 mol % or less. Such ranges tend to reduce the haze, thus are preferable.

Of the total dicarboxylic acids constituting the constituent units derived from a dicarboxylic acid in the polyamide resin (B), the lower limit for the ratio of an α,ω-linear aliphatic dicarboxylic acid having from 4 to 8 carbons is preferably 33 mol % or more, more preferably 35 mol % or more, still more preferably 38 mol % or more, and even more preferably 40 mol % or more. The upper limit for the ratio of the α,ω-linear aliphatic dicarboxylic acid having from 4 to 8 carbons is preferably 67 mol % or less, more preferably 65 mol % or less, even more preferably 62 mol % or less, further still more preferably 60 mol % or less, and may be 59 mol % or less. Such ranges tend to further improve oxygen barrier properties of the resin composition.

Examples of the α,ω-linear aliphatic dicarboxylic acids having from 4 to 8 carbons in the polyamide resin (B) include succinic acid, glutaric acid, pimelic acid, suberic acid, and adipic acid, and adipic acid is preferred. One type, or two or more types of the α,ω-linear aliphatic dicarboxylic acids having from 4 to 8 carbons may be included.

Of the total dicarboxylic acids constituting the constituent units derived from a dicarboxylic acid in the polyamide resin (B), the ratio of the total of isophthalic acid and the α,ω-linear aliphatic dicarboxylic acid having from 4 to 8 carbons is preferably 90 mol % or more, more preferably 95 mol % or more, still more preferably 98 mol % or more, and may be 100 mol %. Such ratios tend to further improve the transparency of the resin composition of the present invention.

Examples of dicarboxylic acids other than isophthalic acid and the α,ω-linear aliphatic dicarboxylic acids having from 4 to 8 carbons include terephthalic acid, 2,6-naphthalenedicarboxylic acid, alicyclic dicarboxylic acids having from 6 to 12 carbons. Specific examples thereof include 1,4-cyclohexanedicarboxylic acid and 1,3-cyclohexanedicarboxylic acid.

The polyamide resin (B) used in the present invention includes the constituent units derived from a dicarboxylic acid and the constituent units derived from a diamine, but the polyamide resin (B) may include a constituent unit besides the constituent units derived from a dicarboxylic acid and the constituent units derived from a diamine; or other moieties, such as end groups. Other constituent units can be exemplified by, but not limited to, constituent units derived from lactams, such as ε-caprolactam, valerolactam, laurolactam, and undecalactam; and constituent units derived from amino carboxylic acids, such as 11-aminoundecanoic acid and 12-aminododecanoic acid. Furthermore, the polyamide resin (B) used in the present invention includes minor components, such as additives used in the synthesis. Typically, 95 mass % or more, preferably 98 mass % or more of the polyamide resin (B) used in the present invention are the constituent units derived from a dicarboxylic acid or the constituent units derived from a diamine.

The polyamide resin (B) used in the present invention includes phosphorus atoms in a ratio from 3 to 300 mass ppm, preferably in a ratio from 4 to 250 mass ppm, and still more preferably in a ratio from 20 to 200 mass ppm.

In addition, the polyamide resin (B) used in the present invention includes calcium atoms. The polyamide resin (B) including calcium atoms can further improve the transparency.

Furthermore, the polyamide resin (B) used in the present invention includes calcium atoms in a molar ratio of phosphorus atoms:calcium atoms from 1:0.3 to 0.7. The molar ratio of phosphorus atoms:calcium atoms in the polyamide resin (B) used in the present invention is preferably in a ratio from 1:0.4 to 0.6, still more preferably in a ratio from 1:0.45 to 0.55, and particularly preferably in a ratio from 1:0.48 to 0.52.

The polyamide resin (B) used in the present invention includes phosphorus atoms in a ratio from 3 to 300 mass ppm, and calcium atoms so as to be the ratio that phosphorus atoms:calcium atoms of 1:0.3 to 0.7, as described above. Such configurations can provide a resin composition having higher transparency and lower yellowness (YI value). Furthermore, a resin composition having excellent transparency after heating treatment can be obtained. The calcium atoms are preferably derived from calcium hypophosphite.

The method for measuring the phosphorus atom concentration follows the method described in the examples mentioned below. The calcium atom concentration is also measured by a similar method to that for the phosphorus atom concentration.

A number average molecular weight of the polyamide resin (B) in the present invention is preferably from 5000 to 100000.

Method for Producing Polyamide Resin (B)

Next, one example of a method for producing the polyamide resin (B) used in the present invention will be described. The polyamide resin (B) used in the present invention is preferably a polyamide resin produced by the method described below, but it is needless to say that the polyamide resin (B) is not limited thereto.

The method for producing the polyamide resin (B) used in the present invention includes polycondensating a diamine and a dicarboxylic acid, for example, in the presence of calcium hypophosphite, wherein 70 mol % or greater of the diamine is m-xylylenediamine, and from 30 to 60 mol % of the dicarboxylic acid is an α,ω-linear aliphatic dicarboxylic acid having from 4 to 8 carbons, and from 70 to 40 mol % of the dicarboxylic acid is isophthalic acid. The synthesis in the presence of calcium hypophosphite can provide a polyamide resin with the phosphorus atom concentration in the predetermined value, and can reduce yellowness (YI value). Also, the synthesis can provide a polyamide resin with the calcium atom concentration in the predetermined range, and can improve transparency. Here, a part or all of the hypophosphite salt is converted to, for example, phosphite salt (e.g., calcium phosphite), phosphate salt (e.g., calcium phosphate), polyphosphate salt (e.g., calcium polyphosphate) via oxidation during polycondensation or secondary processing. In addition, the ratio varies depending on the conditions, such as the polycondensation conditions and oxygen concentration during the polycondensation. Thus, for example, even in a case where the polyamide resin (B) used in the present invention includes calcium atoms or phosphorus atoms, no calcium hypophosphite may be present in some cases.

The polycondensation is typically a melt polycondensation method, and preferably a method wherein the raw material diamine is added drop-wise to the melted raw material dicarboxylic acid during the temperature increase under pressure while removing condensed water to polymerize the mixture, or a method wherein a salt including the raw material diamine and the raw material dicarboxylic acid is heated under pressure in the presence of water while removing the added water and condensed water to proceed the polymerization in a melted state.

In the present invention, calcium hypophosphite is preferably added so that the phosphorus atom concentration included in the polyamide resin (B) is from 3 to 300 mass ppm. A more preferred range is a range similar to the preferred range of the ratio of phosphorus atoms included in the polyamide resin (B) described above.

In addition, during the polycondensation, other alkali metal compounds may be added in combination with calcium hypophosphite. The addition of the alkali metal compound allows the amidation reaction rate to be controlled. Examples of the alkali metal compound include sodium acetate. When an alkali metal compound is added, a molar ratio of the alkali metal compound/calcium hypophosphite is preferably from 0.5 to 2.0.

Other polymerization conditions can be taken into consideration with reference to descriptions in JP 2015-098669 A and the pamphlet of WO 2012/140785, the contents of which are incorporated in the present specification.

Furthermore, details of the raw materials, such as diamines and dicarboxylic acids, are synonymous with those described for the polyamide resin above, and the preferred ranges are also the same.

Blend Ratio of Polyamide Resin (A) and Polyamide Resin (B)

From the perspective of oxygen barrier properties and tensile elongation at break, the resin composition of the present invention includes from 20 to 80 parts by mass of the polyamide resin (A) and from 80 to 20 parts by mass of the polyamide resin (B), preferably from 23 to 77 parts by mass of the polyamide resin (A) and from 77 to 23 parts by mass of the polyamide resin (B), more preferably from 35 to 77 parts by mass of the polyamide resin (A) and from 65 to 23 parts by mass of the polyamide resin (B), still more preferably from 45 to 77 parts by mass of the polyamide resin (A) and from 55 to 23 parts by mass of the polyamide resin (B), even more preferably from 45 to 65 parts by mass of the polyamide resin (A) and from 55 to 35 parts by mass of the polyamide resin (B), even still more preferably from 45 to 60 parts by mass of the polyamide resin (A) and from 55 to 40 parts by mass of the polyamide resin (B), and further still more preferably from 45 to 55 parts by mass of the polyamide resin (A) and from 55 to 45 parts by mass of the polyamide resin (B).

One type each, or two or more types of the polyamide resin (A) and the polyamide resin (B) may be included. In a case where two or more types thereof are included, the total amount is preferably within the range described above.

The resin composition of the present invention may or may not include a polyamide resin besides the polyamide resin (A) and the polyamide resin (B). Specific examples of other polyamide resins include polyamide 11, polyamide 12, MXD10 (poly-m-xylylene sebacamide), MPXD10 (poly m-,p-xylylene sebacamide), and PXD10 (poly-p-xylylene sebacamide). The resin composition of the present invention may include one type each, or two or more types of these other polyamide resins.

The resin composition of the present invention is preferably substantially free of a polyamide resin other than the polyamide resin (A) and the polyamide resin (B). Substantially free means that the ratio of the polyamide resin other than the polyamide resin (A) and the polyamide resin (B) in the polyamide resin included in the resin composition of the present invention is 3 mass % or less, and preferably 1 mass % or less.

The resin composition of the present invention may include a component besides the polyamide resins described above. Examples of components besides the polyamide resins include fillers, matting agents, heat-resistant stabilizers, weather-resistant stabilizers, ultraviolet absorbers, plasticizers, flame retardants, antistatic agents, coloration inhibitors, anti-gelling agents, impact modifiers, lubricants, colorants, and electrically conductive additives. The resin composition of the present invention may include one type each, or two or more types of these additives.

The resin composition of the present invention is preferably substantially free of silicate salt. The resin composition configured to be substantially free of silicate salt can further improve the transparency. Substantially free of silicate salt means that the content of silicate salt is less than 0.01 mass % of the resin composition, and preferably 0.001 mass % or less.

The resin composition of the present invention can provide a haze of 2.5% or less, even 1.0% or less, and particularly 0.7% or less, when formed into a 100-μm thick monolayer film. The lower limit for the haze is desirably 0%, but the required performance may be sufficiently satisfied at 0.1% or greater, or even at 0.2% or greater. The haze is measured by a method described in the examples mentioned below.

The resin composition of the present invention can provide an oxygen transmission rate (OTR) of 10 cc/($m^2 \cdot day \cdot atm$) or less when formed into a 100-μm thick monolayer film. The lower limit for the oxygen transmission rate is desirably 0 cc/($m^2 \cdot day \cdot atm$), but the required performance may be sufficiently satisfied even at 0.5 cc/($m^2 \cdot day \cdot atm$) or greater. The oxygen transmission rate (OTR) is measured by a method described in the examples mentioned below.

The resin composition of the present invention can be formed into a 100-μm thick monolayer film, which exhibits a tensile elongation at break of 5% or longer, even 70% or longer, or 100% or longer, as measured at a tensile speed of 50 mm/min under an atmosphere of 23° C. and relative humidity (RH) of 50% in accordance with JIS K7127. The upper limit for the tensile elongation at break is not particularly limited, but the required performance may be sufficiently satisfied even at 300% or less, for example. The tensile elongation at break is measured by a method described in the examples mentioned below.

The resin composition of the present invention can provide a YI value of 5.0 or less, or even 3.3 or less, 2.5 or less, or 2.0 or less, when formed into a 100-μm thick monolayer film. The lower limit for the YI value is ideally 0, but the required performance may be sufficiently satisfied at 0.5 or greater, or even at 1.0 or greater, for example. The YI value is measured by a method described in the examples mentioned below.

Molded Article

The present invention also relates to a molded article formed of the resin composition of the present invention. Furthermore, the present invention relates to a molded product including a layer formed of the resin composition of the present invention. That is, the resin composition of the present invention can be molded into various molded articles. The method for producing molded articles including the resin composition of the present invention is not particularly limited, and a molding method commonly used for thermoplastic resins, i.e., molding methods, such as injection molding, hollow molding, extrusion molding, and press molding can be applied.

The resin composition and the molded article of the present invention are widely used in transportation machine parts, such as those for automobiles; general mechanical parts, precision mechanical parts, electronic and electrical equipment parts, OA equipment parts, building material-related parts and housing facility-related parts, medical devices, leisure sporting goods, amusement goods; containers, such as those for medical products and food; defense and aerospace products, for example.

Examples of the molded articles include monolayer films (intended to include monolayer sheets), multilayer films (intended to include multilayer sheets), fibers, yarns, monofilaments, multifilaments, ropes, tubes, hoses, various molding materials, containers, various parts, finished articles, and housings. Furthermore, the molded articles (in particular, films, monofilaments, and multifilaments) may be stretched.

Films

The present invention relates to a film formed of the resin composition of the present invention. The film of the present invention can be used as a monolayer film. The monolayer film can have a thickness from 5 to 1000 μm, even from 15 to 500 μm, and particularly from 50 to 200 μm.

The monolayer film can be preferably utilized in plastic wraps, pouches of various shapes, container lid materials; or containers, such as bottles, cups, trays, and tubes. Details of the container will be described below.

Multilayer Film

The present invention relates to a multilayer film including a layer formed of the resin composition of the present invention. The multilayer film preferably further includes a polyolefin resin layer.

Specific examples of the multilayer film of the present invention include a multilayer film formed of: a monolayer film formed by using the resin composition of the present invention; and any other resin film. Examples of the resin that constitutes the other resin film include polyamide resins other than the resin composition of the present invention, polyolefin resins, and polyester resins, and polyolefin resins are preferred, and polypropylene resins and polyethylene resins are more preferred.

Examples of these multilayer films include: a method for coextruding the resin composition of the present invention and a resin composition including the other resin as a main component; and a method for adhering a monolayer film formed by using the resin composition of the present invention and the other resin film with, e.g., an adhesive.

The multilayer film can be preferably utilized in plastic wraps, pouches of various shapes, container lid materials; or containers, such as bottles, cups, trays, and tubes. Details of the container will be described below.

Figure 1:
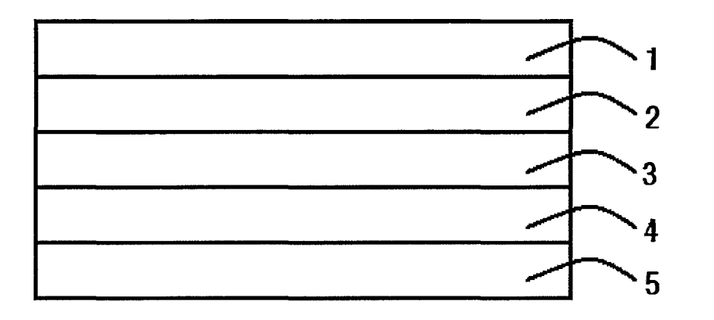
FIG. 1 is a schematic view illustrating a configuration of a multilayer film of the present invention.

FIG. 1 illustrates one example of a multilayer film of the present invention, including a polyolefin resin layer 1, an adhesive layer 2, an intermediate layer 3 (a layer formed of the resin composition of the present invention), an adhesive layer 4, and a polyolefin resin layer 5. In FIG. 1, the polyolefin resin layer 1 and the polyolefin resin layer 5 may be the same or different from each other. In addition, in FIG. 1, the adhesive layer 2 and the adhesive layer 4 may be the same or different from each other.

The polyolefin resin layer is preferably a polypropylene resin layer or a polyethylene resin layer. The thickness of the polyolefin resin layer is preferably from 10 to 500 μm, and more preferably from 20 to 100 μm.

The total thickness of the multilayer film of the present invention is preferably from 0.1 to 2.5 mm.

The adhesive layer preferably includes a thermoplastic resin having adhesiveness. Examples of the thermoplastic resin having adhesiveness include an acid-modified polyolefin resin, which is prepared by modifying a polyolefin resin, such as polyethylene or polypropylene, with an acid, such as an unsaturated carboxylic acid including acrylic acid, methacrylic acid, maleic acid, maleic anhydride, fumaric acid, and itaconic acid; a polyester-based thermoplastic elastomer including polyester-based block copolymer as a main component.

The thickness of the adhesive layer is preferably from 2 to 100 μm, more preferably from 5 to 90 μm, and still more preferably from 10 to 80 μm from the perspective of ensuring molding processability while exhibiting practical adhesive strength.

Container

The resin composition of the present invention is preferably used in monolayer or multilayer containers. The shape of the container is not particularly limited, and may be, for example, a molded container, such as a bottle, a cup, a tube, a tray, and a Tapperware; or may be a bag-shaped container, such as a pouch, a standing pouch, and a zipper storage bag. In addition, in a case where the multi-layer container has a flange portion, the multi-layer container may be subjected to a special processing to impart an easy-peel function to the flange portion.

The multilayer container includes a container formed of: a layer formed by using the resin composition of the present invention; and a layer formed of any other resin layer. Such multi-layer containers can be produced by any method, such as extrusion molding and extrusion blow molding. Examples thereof include a method that includes preparing a multi-layer sheet production apparatus equipped with, for example, three extruders, a feedblock, a T-die, a cooling roll, and a winder; extruding a composition including a polyolefin resin (e.g., a polypropylene resin and polyethylene resin) as a main component from the first extruder, an adhesive resin from the second extruder, and a resin composition of the present invention from the third extruder, respectively, to form a multilayer sheet composed of three types of resins in a five-layer structure of polyolefin resin layer/adhesive layer/layer of the resin composition of the present invention (intermediate layer)/adhesive layer/polyolefin resin layer through the feedblock; heating and softening the sheet, then forming the sheet into a container shape by bringing the sheet into close contact with the die by a thermoforming method using a vacuum, compressed air, or a combination of a vacuum and compressed air; and trimming this to obtain a container. Here, the sheet surface temperature during the thermoforming is preferably in the range from 130 to 200° C., and more preferably in the range from 150 to 180° C. from the perspective of shapability. Still more, the multilayer sheet production apparatus and the method for molding the container are not limited thereto, and any method can be applied.

The container (preferably a multi-layer container) can include and store a variety of articles effective to visualize the contents to enhance customers' buying motivation. Examples thereof include processed seafood products, processed livestock products, rice, and liquid foods. In particular, the container is suitable for storing foods that are heat-sterilized at high temperature of 100° C. or higher and are susceptible to the influence of oxygen. The details thereof can be taken into consideration with reference to the paragraphs from 0032 to 0035 of JP 2011-37199 A, the contents of which are incorporated in the present specification.

EXAMPLES

The present invention will be described more specifically by way of the following examples. Those shown in the examples below, such as materials, used amounts, ratios, processing contents, and processing procedures can be changed as appropriate as long as the spirit of the present invention is not departed. Thus, the scope of the present invention is not limited to the specific examples described below.

Polyamide Resin (A)

Polyamide 6 (PA6): Ube Nylon 1022B, available from Ube Industries, Ltd.

Polyamide 6,66 (PA6,66): Novamid 2030FC, available from DSM

Polyamide 6I/6T (PA6I/6T): Grivory G21, available from EMS-GRIVORY, the molar ratio of isophthalic acid to terephthalic acid is 2:1.

Polyamide Resin (B)

Synthetic Example B-1

Polyamide resin B-1 shown in Table 1 was synthesized according to the following method.

Into a reaction vessel equipped with a stirrer, a partial condenser, a total condenser, a thermometer, a dropping funnel, a nitrogen introduction tube, and a strand die, 7000 g of adipic acid (47.90 mol), 5305 g of isophthalic acid (31.93 mol), 1.67 g of calcium hypophosphite ($Ca(H_2PO_2)_2$) (30 mass ppm in terms of phosphorus atom concentration in the polyamide resin), and 1.07 g of sodium acetate were precisely weighed and placed. After thorough purge with nitrogen, the reaction vessel was charged with nitrogen to an internal pressure of 0.4 MPa, and the inside of the system was heated to 190° C. while stirring under a small amount of nitrogen stream. The molar ratio of sodium acetate/calcium hypophosphite was 1.33.

To this, 10819 g of m-xylylenediamine (79.43 mol) was added drop-wise under stirring, and the temperature in the system was continuously increased while removing the generating condensed water out of the system. After completing the drop-wise addition of m-xylylenediamine, the internal temperature was increased. When the temperature reached 255° C., the pressure in the reaction vessel was reduced, and the internal temperature was further increased to continue a melt polycondensation reaction at 260° C. for 10 minutes. Thereafter, the inside of the system was pressurized with nitrogen, the resulting polymer was extruded through the strand die, and made into pellets. Thus, approximately 21 kg of polyamide resin pellets B-1 were obtained.

The resin B-1 was found to have ΔHm, a crystal melting enthalpy during the temperature increasing process, of approximately 0 J/g and be amorphous.

The resulting polyamide resin pellets were used for the evaluation according to the evaluation methods described below.

Synthetic Example B-2

The polyamide resin B-2 was obtained in a similar manner as in Synthetic Example B-1 with the exception that the molar ratio of adipic acid to isophthalic acid was modified to 50:50.

The resin B-2 was found to have ΔHm, a crystal melting enthalpy during the temperature increasing process, of approximately 0 J/g and be amorphous.

Synthetic Example B-3

The polyamide resin B-3 was obtained in a similar manner as in Synthetic Example B-1 with the exception that the molar ratio of adipic acid to isophthalic acid was modified to 40:60.

The resin B-3 was found to have ΔHm, a crystal melting enthalpy during the temperature increasing process, of approximately 0 J/g and be amorphous.

Synthetic Example B-4

The polyamide resin B-4 was obtained in a similar manner as in Synthetic Example B-1 with the exception that the molar ratio of adipic acid to isophthalic acid was modified to 50:50, m-xylylenediamine was replaced with an equivalent mixture of xylylenediamines (a mixture of m-xylylenediamine and p-xylylenediamine with a molar ratio of 70:30), and the addition amount of calcium hypophosphite was modified such that the resulting polyamide resin has the values shown in Table 2.

The resin B-4 was found to have ΔHm, a crystal melting enthalpy during the temperature increasing process, of approximately 0 J/g and be amorphous.

Synthetic Example B-5

The polyamide resin B-5 was obtained in a similar manner as in Synthetic Example B-1 with the exception that the molar ratio of adipic acid to isophthalic acid was modified to 100:0, and the addition amount of calcium hypophosphite was modified such that the resulting polyamide resin has the values shown in Table 3-1.

Synthetic Example B-6

The polyamide resin B-6 was obtained in a similar manner as in Synthetic Example B-1 with the exception that the molar ratio of adipic acid to isophthalic acid was modified to 75:25.

Synthetic Example B-7

Procedures were carried out in a similar manner as in Synthetic Example B-1 with the exception that the molar ratio of adipic acid to isophthalic acid was modified to 25:75, and the addition amount of calcium hypophosphite was modified such that the resulting polyamide resin has the values in Table 3-2, but the synthesis of the resin resulted in a failure.

Synthetic Example B-8

The polyamide resin B-8 was obtained in a similar manner as in Synthetic Example B-1 except that neither sodium acetate nor calcium hypophosphite was added.

Synthetic Example B-9

The polyamide resin B-9 was obtained in a similar manner as in Synthetic Example B-1 with the exception that the addition amount of calcium hypophosphite was modified such that the resulting polyamide resin has the values shown in Table 3-2.

Synthetic Example B-10

The polyamide resin B-10 was obtained in a similar manner as in Synthetic Example B-1 with the exception that sodium hypophosphite was used instead of calcium hypophosphite, and the addition amount of sodium phosphite was modified such that the resulting polyamide resin has the values shown in Table 3-2.

Method for Measuring Phosphorus Atom Concentration

First, 0.2 g of the polyamide resin and 8 mL of 35 mass % nitric acid aqueous solution were put into a TFM-modified PTFE (available from 3M) container, and microwave decomposition was carried out at 230° C. for 30 minutes using ETHOS One, available from Milestone General K.K. The decomposition liquid was adjusted to a predetermined volume with ultrapure water to use the resulting solution for ICP measurement. The phosphorus atom concentration was measured using an ICPE-9000 available from Shimadzu Corporation.

Example 1-1

Preparation of Monolayer Film

The polyamide resin (A) and the polyamide resin (B) shown in Table 1 were dry blended, and then fed to a single screw extruder with a T die (PTM-30 available from PLABOR Research Laboratory of Plastics Technology Co., Ltd.) and kneaded. The kneaded material was extruded at an extrusion temperature of 260° C. to prepare a 100-μm thick monolayer film.

Note that Table 1 shows values of mass ratios (the same for Table 2 and thereafter).

Evaluation of Transparency

Haze was measured for the monolayer film obtained above. The haze measurement was performed in accordance with JIS K7136.

Evaluation of Oxygen Barrier Properties

Oxygen transmission rate (OTR) was measured for the monolayer film obtained above by an isopiestic method under an atmosphere of 23° C. and a relative humidity (RH) of 90%.

The oxygen transmission rate (OTR) was measured using an oxygen transmission rate measurement apparatus (product name: "OX-TRAN (trade name) 2/21" available from MOCON, Inc.).

Tensile Elongation at Break

Tensile elongation at break was measured for the monolayer film obtained above at a tensile speed of 50 mm/min under an atmosphere of 23° C. and relative humidity (RH) of 50% in accordance with JIS K7127. Units were expressed in %.

Method for Measuring YI Value

Yellowness (YI value) was measured for the monolayer film obtained above. A color turbidity meter (product name: "COH-300 A" available from Nippon Denshoku Industries Co., Ltd.,) was used for the measurement.

Examples 1-2 to 1-10 and Comparative Examples 1-1 to 1-11

Films of Examples 1-2 to 1-10 and Comparative Examples 1-1 to 1-11 were obtained as in Example 1-1 but with modifications as shown in Table 1 to Table 3-2. The resulting films were evaluated as in Example 1-1.

TABLE 1

|  |  |  | \multicolumn{5}{c}{Examples} |
| --- | --- | --- | --- | --- | --- | --- | --- |
|  |  |  | 1-1 | 1-2 | 1-3 | 1-4 | 1-5 |
|  | Polyamide resin (A) |  | PA6 | PA6 | PA6 | PA6 | PA6 |
| Polyamide resin (B) | Type of polyamide resin (B) |  | B-1 | B-2 | B-3 | B-2 | B-2 |
|  | Diamine constituent unit | MXDA | 100 | 100 | 100 | 100 | 100 |
|  |  | PXDA | 0 | 0 | 0 | 0 | 0 |
|  | Dicarboxylic acid constituent unit | Adipic acid | 60 | 50 | 40 | 50 | 50 |
|  |  | Isophthalic acid | 40 | 50 | 60 | 50 | 50 |
|  | Type of hypophosphite salt |  | Ca salt | Ca salt | Ca salt | Ca salt | Ca salt |
|  | Phosphorus atom concentration in polyamide resin (B) (ppm) |  | 30 | 30 | 30 | 30 | 30 |
|  | Molar ratio of phosphorus atoms:calcium atoms |  | 1:0.5 | 1:0.5 | 1:0.5 | 1:0.5 | 1:0.5 |
|  | Polyamide resin (A):polyamide resin (B) (mass ratio) |  | 50:50 | 50:50 | 50:50 | 25:75 | 75:25 |
|  | Transparency evaluation (Haze) (%) |  | 0.6 | 0.4 | 0.3 | 0.5 | 0.4 |
|  | Oxygen barrier evaluation (cc/(m$^2$ * day * atm)) |  | 5 | 5 | 5 | 3 | 8 |
|  | Tensile elongation at break (%) |  | 123 | 138 | 133 | 10 | 278 |
|  | YI value |  | 1.2 | 1.1 | 1.3 | 1.2 | 1.4 |

TABLE 2

|  |  |  | \multicolumn{5}{c}{Examples} |
| --- | --- | --- | --- | --- | --- | --- | --- |
|  |  |  | 1-6 | 1-7 | 1-8 | 1-9 | 1-10 |
|  | Polyamide resin (A) |  | PA6 | PA6,66 | PA6,66 | PA6I/6T | PA6I/6T |
| Polyamide resin (B) | Type of polyamide resin (B) |  | B-4 | B-2 | B-2 | B-2 | B-2 |
|  | Diamine constituent unit | MXDA | 70 | 100 | 100 | 100 | 100 |
|  |  | PXDA | 30 | 0 | 0 | 0 | 0 |
|  | Dicarboxylic acid constituent unit | Adipic acid | 50 | 50 | 50 | 50 | 50 |
|  |  | Isophthalic acid | 50 | 50 | 50 | 50 | 50 |
|  | Type of hypophosphite salt |  | Ca salt | Ca salt | Ca salt | Ca salt | Ca salt |
|  | Phosphorus atom concentration in polyamide resin (B) (ppm) |  | 180 | 30 | 30 | 30 | 30 |
|  | Molar ratio of phosphorus atoms:calcium atoms |  | 1:0.5 | 1:0.5 | 1:0.5 | 1:0.5 | 1:0.5 |
|  | Polyamide resin (A):polyamide resin (B) (mass ratio) |  | 50:50 | 25:75 | 75:25 | 25:75 | 75:25 |
|  | Transparency evaluation (Haze) (%) |  | 1.8 | 0.5 | 0.2 | 2.2 | 0.4 |
|  | Oxygen barrier evaluation (cc/(m$^2$ * day * atm)) |  | 5 | 5 | 9 | 1 | 3 |
|  | Tensile elongation at break (%) |  | 83 | 15 | 290 | 10 | 150 |
|  | YI value |  | 1.9 | 1.2 | 1.3 | 1.8 | 1.6 |

TABLE 3-1

|  |  |  | \multicolumn{6}{c}{Comparative Examples} |
| --- | --- | --- | --- | --- | --- | --- | --- | --- |
|  |  |  | 1-1 | 1-2 | 1-3 | 1-4 | 1-5 | 1-6 |
|  | Polyamide resin (A) |  | PA6 | PA6 | PA6 | PA6 | PA6 | — |
| Polyamide resin (B) | Type of polyamide resin (B) |  | — | B-5 | B-5 | B-5 | B-6 | B-7 |
|  | Diamine constituent unit | MXDA | — | 100 | 100 | 100 | 100 | 100 |
|  |  | PXDA | — | 0 | 0 | 0 | 0 | 0 |
|  | Dicarboxylic acid constituent unit | Adipic acid | — | 100 | 100 | 100 | 75 | 25 |
|  |  | Isophthalic acid | — | 0 | 0 | 0 | 25 | 75 |
|  | Type of hypophosphite salt |  | — | Ca salt | Ca salt | Ca salt | Ca salt | Ca salt |
|  | Phosphorus atom concentration in polyamide resin (B) (ppm) |  | — | 100 | 100 | 100 | 30 | 180 |
|  | Molar ratio of phosphorus atoms:calcium atoms |  | — | 1:0.5 | 1:0.5 | 1:0.5 | 1:0.5 | 1:0.5 |
|  | Polyamide resin (A):polyamide resin (B) (mass ratio) |  | 100:0 | 75:25 | 50:50 | 25:75 | 50:50 | 50:50 |
|  | Transparency evaluation (Haze) (%) |  | 0.2 | 21.9 | 24.7 | 22.4 | 12.8 | Synthesis failed |
|  | Oxygen barrier evaluation (cc/(m$^2$ * day * atm)) |  | 18 | 12 | 8 | 4 | 6 | Synthesis failed |
|  | Tensile elongation at break (%) |  | 360 | 270 | 75 | 12 | 102 | Synthesis failed |
|  | YI value |  | 1.2 | 4.3 | 3.1 | 3.6 | 1.9 | Synthesis failed |

TABLE 3-2

|  |  |  | Comparative Examples | | | | |
|---|---|---|---|---|---|---|---|
|  |  |  | 1-7 | 1-8 | 1-9 | 1-10 | 1-11 |
|  | Polyamide resin (A) |  | PA6 | PA6 | PA6 | PA6 | PA6 |
| Polyamide | Type of polyamide resin (B) |  | B-2 | B-2 | B-8 | B-9 | B-10 |
| resin (B) | Diamine constituent unit | MXDA | 100 | 100 | 100 | 100 | 100 |
|  |  | PXDA | 0 | 0 | 0 | 0 | 0 |
|  | Dicarboxylic acid constituent unit | Adipic acid | 50 | 50 | 60 | 60 | 60 |
|  |  | Isophthalic acid | 50 | 50 | 40 | 40 | 40 |
|  | Type of hypophosphite salt |  | Ca salt | Ca salt | Ca salt | Ca salt | Na salt |
|  | Phosphorus atom concentration in polyamide resin (B) (ppm) |  | 30 | 30 | 0 | 320 | 30 |
|  | Molar ratio of phosphorus atoms:calcium atoms |  | 1:0.5 | 1:0.5 | — | 1:0.5 | 0 |
|  | Polyamide resin (A):polyamide resin (B) (mass ratio) |  | 90:10 | 10:90 | 50:50 | 50:50 | 50:50 |
|  | Transparency evaluation (Haze) (%) |  | 0.3 | 0.3 | 0.6 | 11.2 | 12.1 |
|  | Oxygen barrier evaluation (cc/(m$^2$ * day * atm)) |  | 14 | 2 | 5 | 5 | 5 |
|  | Tensile elongation at break (%) |  | 360 | 4 | 132 | 75 | 75 |
|  | YI value |  | 1.2 | 1.8 | 24.3 | 2.9 | 3.4 |

The ppm unit in Table 1 to Table 3-2 is in mass ppm (the same for Table 4).

As is clear from the above tables, in a case where the polyamide resin composition of the present invention was used, the resulting films had excellent transparency and oxygen barrier properties, and also had excellent tensile elongation at break (Example 1-1 to Example 1-10).

On the other hand, in a case where the polyamide resin (B) was not included (Comparative Example 1-1), or in a case where the polyamide resin (B) was included but in a too small ratio (Comparative Example 1-7), the increase in the value of the oxygen transmission rate was observed. In addition, in a case where the polyamide resin (B) did not include isophthalic acid (Comparative Example 1-2 to Comparative Example 1-4), or in a case where the polyamide resin (B) included isophthalic acid but in a small ratio (Comparative Example 1-5), the resulting oxygen barrier properties and transparency were impaired. On the other hand, when the ratio of isophthalic acid in the polyamide resin (B) was too high (Comparative Example 1-6), the synthesis of the polyamide resin resulted in failure. In addition, in a case where the content ratio of the polyamide resin (B) was too high (Comparative Example 1-8), the decrease in the tensile elongation at break was observed. Furthermore, in a case where the polyamide resin (B) did not include phosphorus atoms, the increase in the YI value was observed (Comparative Example 1-9). On the other hand, in a case where the phosphorus atom concentration in the polyamide resin (B) exceeded 300 mass ppm (Comparative Example 1-10), the transparency (haze) was impaired. In addition, in a case where calcium atoms were not included, the increase in the YI value was observed, and the haze was also impaired.

Example 2-1

Preparation of Multilayer Film

Using a multilayer sheet production apparatus equipped with three single screw extruders and a feedblock for three types of resins in five layers, the extrusion temperatures were set at 240° C. for the polyolefin resin layers, 230° C. for the adhesive layers, and 260° C. for the intermediate layer to obtain a multilayer film in the layer structure pattern A.

The layer structure A was as follows.

Polyethylene Resin Layer/Adhesive Layer/Intermediate Layer/Adhesive Layer/Polyethylene Resin Layer The thickness is 30/20/100/20/30 (units: μm) in this order.

Polyethylene resin: Novatec LL UF240, available from Japan Polyethylene Corporation Resin constituting the adhesive layer: MODIC M545, available from Mitsubishi Chemical Corporation, acid-modified polyolefin resin Resin constituting the intermediate layer: as described in Table 4

Evaluation of Transparency

Haze was measured for the multilayer film obtained above. The haze measurement was performed in accordance with JIS K7136.

Evaluation of Transparency After Boiling

The multilayer film obtained above was boiled at 90° C. for 30 minutes. Thereafter, haze was measured. The haze measurement was performed in accordance with JIS K7136.

Evaluation of Oxygen Barrier Properties

Oxygen barrier properties were measured for the multilayer film obtained above by an isopiestic method under an atmosphere of 23° C. and a relative humidity (RH) of 90%.

Oxygen barrier properties were measured using an oxygen transmission rate measurement apparatus (product name: "OX-TRAN (trade name) 2/21" available from MOCON, Inc.).

Example 2-2 to Example 2-6

Multilayer films of Example 2-2 to Example 2-6 were obtained as in Example 2-1 but with changes as shown in Table 4. The resulting films were evaluated as in Example 2-1.

The layer structure B was as follows.

Polypropylene Resin Layer/Adhesive Layer/Intermediate Layer/Adhesive Layer/Polypropylene Resin Layer The thickness is 30/20/100/20/30 (units: μm) in this order.

Polypropylene resin: Novatec PP FY6C, available from Japan Polypropylene Corporation Resin constituting the adhesive layer: MODIC P604V, available from Mitsubishi Chemical Corporation, acid-modified polyolefin resin Resin constituting the intermediate layer: as described in Table 4

TABLE 4

| | | | | Examples | | | | | |
|---|---|---|---|---|---|---|---|---|---|
| | | | | 2-1 | 2-2 | 2-3 | 2-4 | 2-5 | 2-6 |
| | | Layer structure pattern | | A | A | A | A | A | B |
| Composition of intermediate layer | | Polyamide resin (A) | | PA6 | PA6 | PA6 | PA6,66 | PA6,66 | PA6 |
| | Polyamide resin (B) | Type of polyamide resin (B) | | B-2 | B-2 | B-2 | B-2 | B-2 | B-2 |
| | | Diamine constituent unit | MXDA | 100 | 100 | 100 | 100 | 100 | 100 |
| | | | PXDA | 0 | 0 | 0 | 0 | 0 | 0 |
| | | Dicarboxylic acid constituent unit | Adipic acid | 50 | 50 | 50 | 50 | 50 | 50 |
| | | | Isophthalic acid | 50 | 50 | 50 | 50 | 50 | 50 |
| | | Phosphorus atom concentration (mass ppm) | | 30 | 30 | 30 | 30 | 30 | 30 |
| | | Molar ratio of phosphorus atoms:calcium atoms | | 1:0.5 | 1:0.5 | 1:0.5 | 1:0.5 | 1:0.5 | 1:0.5 |
| | | Polyamide resin (A):polyamide resin (B) (mass ratio) | | 50:50 | 25:75 | 75:25 | 25:75 | 75:25 | 50:50 |
| | | Transparency evaluation (Haze) (%) | | 2.6 | 2.8 | 2.4 | 2.6 | 2.1 | 5.4 |
| | | Transparency evaluation after boiling (Haze) (%) | | 6.6 | 7.4 | 4.9 | 6.5 | 5 | 8.9 |
| | | Oxygen barrier properties evaluation (cc/(m² * day * atm)) | | 4 | 3 | 7 | 5 | 8 | 4 |

As is clear from the above results, the multilayer films of the present invention had excellent transparency and oxygen barrier properties. In particular, the multilayer films of the present invention also had excellent transparency after boiling treatment.

REFERENCE SIGNS LIST

1 Polyolefin resin layer
2 Adhesive layer
3 Intermediate layer
4 Adhesive layer
5 Polyolefin resin layer

The invention claimed is:

1. A resin composition comprising from 20 to 80 parts by mass of a polyamide resin (A) and from 80 to 20 parts by mass of a polyamide resin (B) based upon 100 parts by mass of polyamide resin (A) and polyamide resin (B);
    wherein 45 mol % or more of all the constituent units of the polyamide resin (A) are constituent units including an alkylene chain having from 2 to 6 carbons;
    the polyamide resin (B) is an amorphous resin that includes constituent units derived from a diamine and constituent units derived from a dicarboxylic acid, wherein
    90 mol % or more of the constituent units derived from a diamine are derived from a xylylenediamine;
    from 30 to 70 mol % of the constituent units derived from a dicarboxylic acid are derived from an α,ω-linear aliphatic dicarboxylic acid having from 4 to 8 carbons;
    from 70 to 30 mol % of the constituent units derived from a dicarboxylic acid are derived from isophthalic acid, where the total of the amounts of the constituent units derived from the dicarboxylic acid and the constituent units derived from a diamine does not exceed 100 mol % in the polyamide rein (B); and
    the polyamide resin (B) further includes phosphorus atoms in an amount of 3 to 300 mass ppm and calcium atoms, and a ratio of phosphorus atoms:calcium atoms of 1:0.3 to 0.7.

2. The resin composition according to claim 1, wherein the α,ω-linear aliphatic dicarboxylic acid having from 4 to 8 carbons comprises adipic acid.

3. The resin composition according to claim 1, wherein the xylylenediamine comprises m-xylylenediamine.

4. The resin composition according to claim 1, wherein 70 mol % or more of all the constituent units of the polyamide resin (A) are constituent units comprising an alkylene chain having from 2 to 6 carbons; or from 45 to 60 mol % of all the constituent units of the polyamide resin (A) are constituent units comprising an alkylene chain having from 2 to 6 carbons, and from 55 to 40 mol % of all the constituent units of the polyamide resin (A) are constituent units derived from an aromatic dicarboxylic acid, with the proviso that the total does not exceed 100 mol %.

5. The resin composition according to claim 1, wherein the polyamide resin (A) comprises at least one type selected from the group consisting of polyamide 6, polyamide 66, polyamide 6,66, polyamide 6I, polyamide 6T, and polyamide 6I/6T.

6. The resin composition according to claim 1, wherein the calcium atoms included in the polyamide resin (B) are derived from calcium hypophosphite.

7. A molded article formed of the resin composition described in claim 1.

8. A molded article formed of a layer comprising the resin composition described in claim 1.

9. A film formed of the resin composition described in claim 1.

10. A multilayer film formed of a layer including the resin composition described in claim 1.

11. The multilayer film according to claim 10, further comprising a polyolefin resin layer.

12. The resin composition according to claim 1, wherein the resin composition provides an oxygen transmission rate (OTR) of 10 cc/(m²·day·atm) or less when formed into a 100-μm thick monolayer film.

* * * * *